(12) United States Patent
Koskinen et al.

(10) Patent No.: US 7,466,988 B2
(45) Date of Patent: Dec. 16, 2008

(54) ELECTRONIC SYSTEM

(75) Inventors: Topi Koskinen, Tampere (FI); Satu Kalliokulju, Vesilahti (FI); Minna Hokkanen, Tampere (FI); Päivi Jokinen, Tampere (FI); Sanna Kaartinen, Helsinki (FI); Leena Sippola, Oulu (FI)

(73) Assignee: Nokia Corporation, Espoo (FI)

( * ) Notice: Subject to any disclaimer, the term of this patent is extended or adjusted under 35 U.S.C. 154(b) by 562 days.

(21) Appl. No.: 09/892,035

(22) Filed: Jun. 26, 2001

(65) Prior Publication Data

US 2002/0004383 A1 Jan. 10, 2002

(30) Foreign Application Priority Data

Jun. 26, 2000 (FI) .................................. 20001514

(51) Int. Cl.
*H04Q 7/20* (2006.01)
(52) U.S. Cl. ............... 455/456.3; 455/414.2; 455/456.5; 455/466; 715/758; 705/14; 709/206; 709/218
(58) Field of Classification Search ... 455/414.1–414.3, 455/466, 456.5, 456.1, 500, 405, 461, 456.3; 707/1, 10; 370/338; 705/14; 709/218, 206; 340/905; 725/138; 40/591; 715/758
See application file for complete search history.

(56) References Cited

U.S. PATENT DOCUMENTS

| | | | | |
|---|---|---|---|---|
| 4,715,138 A | * | 12/1987 | Cherico | 40/591 |
| 5,214,793 A | * | 5/1993 | Conway et al. | 455/500 |
| 5,510,828 A | * | 4/1996 | Lutterbach et al. | 725/138 |
| 5,907,293 A | | 5/1999 | Tognazzini | 340/903 |
| 5,966,652 A | * | 10/1999 | Coad et al. | 455/412.1 |
| 6,101,532 A | * | 8/2000 | Horibe et al. | 709/206 |
| 6,112,206 A | * | 8/2000 | Morris et al. | 707/10 |
| 6,219,696 B1 | * | 4/2001 | Wynblatt et al. | 709/218 |
| 6,243,740 B1 | * | 6/2001 | Minneman et al. | 709/206 |
| 6,252,522 B1 | * | 6/2001 | Hampton et al. | 340/905 |
| 6,301,472 B1 | * | 10/2001 | Nakasu et al. | 455/405 |
| 6,484,148 B1 | * | 11/2002 | Boyd | 705/14 |
| 6,526,275 B1 | * | 2/2003 | Calvert | 455/418 |
| 6,587,450 B1 | * | 7/2003 | Pasanen | 370/338 |
| 6,718,178 B1 | * | 4/2004 | Sladek et al. | 455/466 |

(Continued)

FOREIGN PATENT DOCUMENTS

WO    WO 99/07125    7/1998

(Continued)

*Primary Examiner*—Md S Elahee
(74) *Attorney, Agent, or Firm*—Perman & Green, LLP (57) ABSTRACT

The invention relates to an electronic system for implementing an optimized way to provide information from a first electronic device to a second portable electronic device, and to a method of implementing a virtual noticeboard. The context in the virtual noticeboard of the first electronic device is arranged to be transmitted to the second device located within a geographically limited coverage area of first radio means of the first device, and the second device comprises selecting means for selecting the reception of the virtual noticeboard of the first device. The contents of the noticeboard may only transmitted to those who enter with their devices the permanent coverage area of the noticeboard, such as an airport. The device implementing the noticeboard and the radio means transmitting its contents may be integrated into one device. The virtual noticeboard may be a global one.

33 Claims, 7 Drawing Sheets

U.S. PATENT DOCUMENTS

| | | | |
|---|---|---|---|
| 6,731,940 B1 * | 5/2004 | Nagendran | 455/456.1 |
| 2001/0036832 A1 * | 11/2001 | McKay | 455/456 |
| 2002/0029197 A1 * | 3/2002 | Kailamaki et al. | 705/40 |
| 2004/0078354 A1 * | 4/2004 | Pass | 707/1 |
| 2004/0198395 A1 * | 10/2004 | Kimoto et al. | 455/456.1 |

FOREIGN PATENT DOCUMENTS

| | | |
|---|---|---|
| WO | WO 98/59506 | 12/1998 |
| WO | WO 99/12104 | 3/1999 |
| WO | WO 99/45732 | 9/1999 |
| WO | WO 00/30379 | 5/2000 |
| WO | WO 00/76231 | 12/2000 |

* cited by examiner

ELECTRONIC SYSTEM

FIELD

The invention relates to an electronic system for implementing an optimized way to provide information from a first electronic device to a second portable electronic device by utilizing a noticeboard. The invention also relates to a method of using a virtual noticeboard.

BACKGROUND

A conventional noticeboard is a means of communication on which notes, notices and the like can be fixed by pins, for example. Usually, noticeboards are local, the messages fixed on them being directed to a particular group of people. A noticeboard is often accessible to anyone who wishes to read a message attached on the noticeboard. The communication is thus not necessarily only directed to a particular person or group but to a larger public as well. This communication is thus of the type "one-to-public".

Nowadays, the WWW (World Wide Web) service and news groups represent collections of noticeboards on the Internet. A message can be arranged on the noticeboard and anyone can read the message on a private person's or a business company's home page or by visiting a particular news group, for example. The local physical noticeboards have thus changed into global virtual noticeboards.

Compared to interpersonal "one-to-one" communication between people, an advantage of the noticeboard is that a message can be left on the noticeboard without having to bother the person at issue at a given time, but he or she can read the message when convenient, either by visiting the place physically or by visiting the virtual noticeboard by using a WWW browser. Furthermore, no-one can be mistakenly left out of a delivery list since no such list exists. In fact, it is not even necessary to know in advance who will eventually read the message.

WAP (Wireless Application Protocol) is a service which enables a user of a terminal in a mobile telephone system, such as a mobile telephone, to browse a WWW service. In such a case, the HTML (Hypertext Markup Language) of the inner structure and appearance of the hypertext normally used in WWW services is replaced by WML (Wireless Markup Language).

A problem with the new virtual noticeboards is that they are global. On many occasions, being global is an advantage but sometimes it is a disadvantage. A disadvantage, particularly when a WAP terminal is used, is that in order to find the right noticeboard, the user has to use a search engine on the Internet and try to find the right noticeboard by using suitable search words. The problem is real since there are at least billions of pages among which it is difficult to find the desired page if the user does not know the Internet address of the page at issue. Due to the limited capacity of radio resources, it is more expensive to use the WAP terminals than Internet-connected computers utilizing fixed data transmission connections. It would thus be advisable to develop methods of finding the desired virtual noticeboard faster.

BRIEF DESCRIPTION

An object of the invention is to provide an improved electronic system and an improved method for using a virtual noticeboard. A system according to claim 1 is set forth as an aspect of the invention. A method according to claim 30 is set forth as an aspect of the invention. An electronic device according to claim 58 is set forth as an aspect of the invention.

Further preferred embodiments of the invention are disclosed in the dependent claims.

The idea underlying the invention is that a virtual noticeboard is made to resemble a conventional noticeboard, i.e. it is bound to a location. Hence, the contents of the noticeboard can only be read by those located within an area geographically such determined that the contents of the noticeboard are useful to the those located within said coverage area. According to the invention, there are three ways to implement the feature of being bound to a location. In a first embodiment, the contents of the noticeboard are only transmitted to those who enter with their terminals the permanent coverage area of the noticeboard, such as an airport, trade fair site, store or other geographically-defined area. In such a case, the contents of the noticeboard are transmitted by using radio means having a coverage area permanently located within the area at issue.

In a second embodiment, both the device implementing the noticeboard and the radio means transmitting the contents of the noticeboard are integrated into the same device, for example into a terminal in a mobile telephone system. Then, too, the virtual noticeboard is, in a way, bound to a location, the location being the coverage area of the radio means around the terminal. Naturally, the place may change as the user of the terminal travels around, but only those close to the user at issue can possibly use his or her noticeboard.

In a third embodiment, the virtual noticeboard is a global one, i.e. its contents can in principle be viewed by a user anywhere in the world, but the information provided by the noticeboard includes location information as metainformation on the area within which the second device is located and for which second device the context in the virtual noticeboard of the first device is arranged. Hence, only relevant information to be shown when being located in the location at issue can be selected manually by the user or automatically by the second device.

As described above, the technical problem of the solutions according to the prior art is the difficulty of finding the desired noticeboard; consequently, valuable radio resource is wasted. The solution of the invention with its technical features provides an optimized solution for implementing a virtual noticeboard. Furthermore, the solution enables novel services, which will be described in greater detail later.

LIST OF DRAWINGS

The preferred embodiments of the invention will be described below by way of example and with reference to the accompanying drawings, in which.

DESCRIPTION OF EMBODIMENTS

Figure 2:
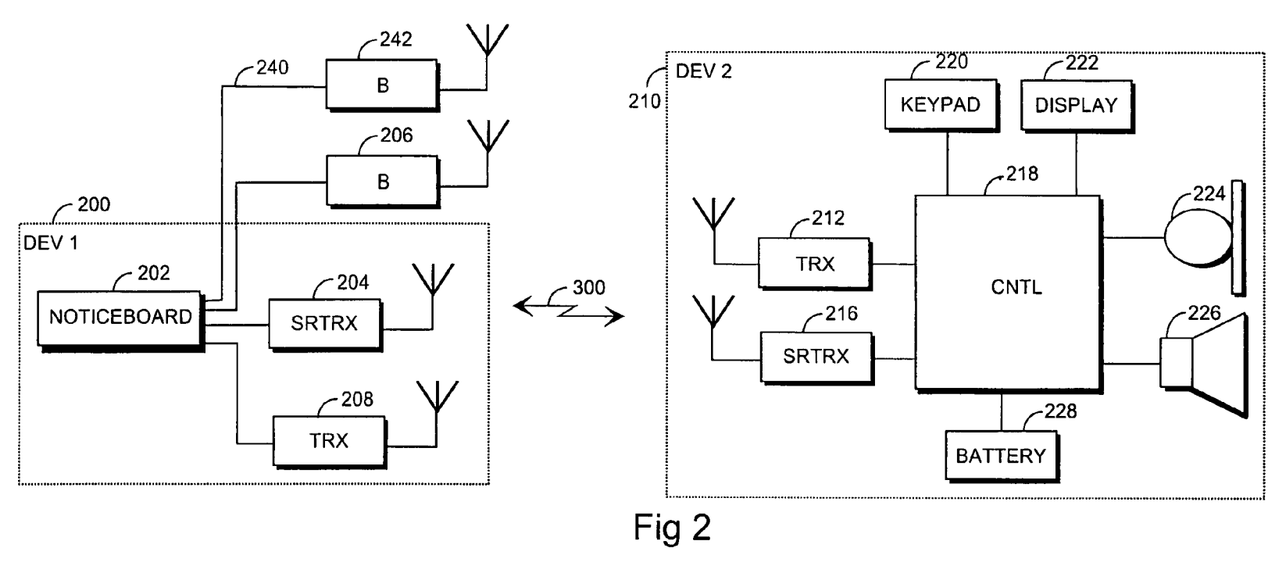
FIG. 2 is a simplified block diagram illustrating structures of a first and a second electronic devices.

Referring to FIG. 2, an example of an electronic system for implementing the process of using a virtual noticeboard will be described. The electronic system comprises at least two electronic devices. For the sake of clarity, the devices will henceforth be called a first device 200 and a second device 210. In the figure, this difference will also be shown by abbreviations DEV1 and DEV2. It is to be noted that the structure of the first and the second devices does not necessarily differ but the designations "first" and "second" describe the role the devices play when the noticeboard is used. Often the structure of the first and the second devices is, however, optimized to suit the role of the device, but devices may exist which can fluently operate in both roles. Although the example only describes one first device and at most a few second devices, it is obvious that real systems may comprise an extremely large number of devices, millions of first devices and hundreds of millions of second devices, for example.

The first electronic device 200 comprises means for implementing a virtual noticeboard 202. The means are typically implemented by computer software in a microprocessor, but implementation by hardware for example as ASIC (Application Specific Integrated Circuit) is also possible. The first device 200 can be a server computer with its software. The software comprises necessary utility software, such as an operating system and data transmission software as well as application software implementing the functionality of the noticeboard. The first device 200 can also be portable user equipment in a mobile telephone system. The structure of such a device is described in closer detail later in connection with the second electronic device, but in principle it comprises similar hardware and software parts to provide the necessary functions to those used in the server computer.

The system further comprises first radio means 204, 206, 208, 242 for implementing data transmission with regard to the virtual noticeboard 202 of the first device 200. The radio means can be implemented in various different ways, which are described in FIG. 2. The transmitted information on the noticeboard 202 can be text and/or voice and/or image and/or moving video image, naturally depending on the data transmission capacity of the radio connection.

The radio means may be located in the first device 200 or in a short-range radio transceiver 204 in connection with the first device 200. An example of such a short-range radio transceiver is an integrated circuit according to the Bluetooth technology which can be used for implementing a radio connection having a coverage area of at most a few hundreds of meters at a frequency of 2.4 gigahertz. A great advantage of using Bluetooth is that the frequency band can be used without charge, but a drawback may be a limited coverage particularly in large spaces.

Figure 1A:
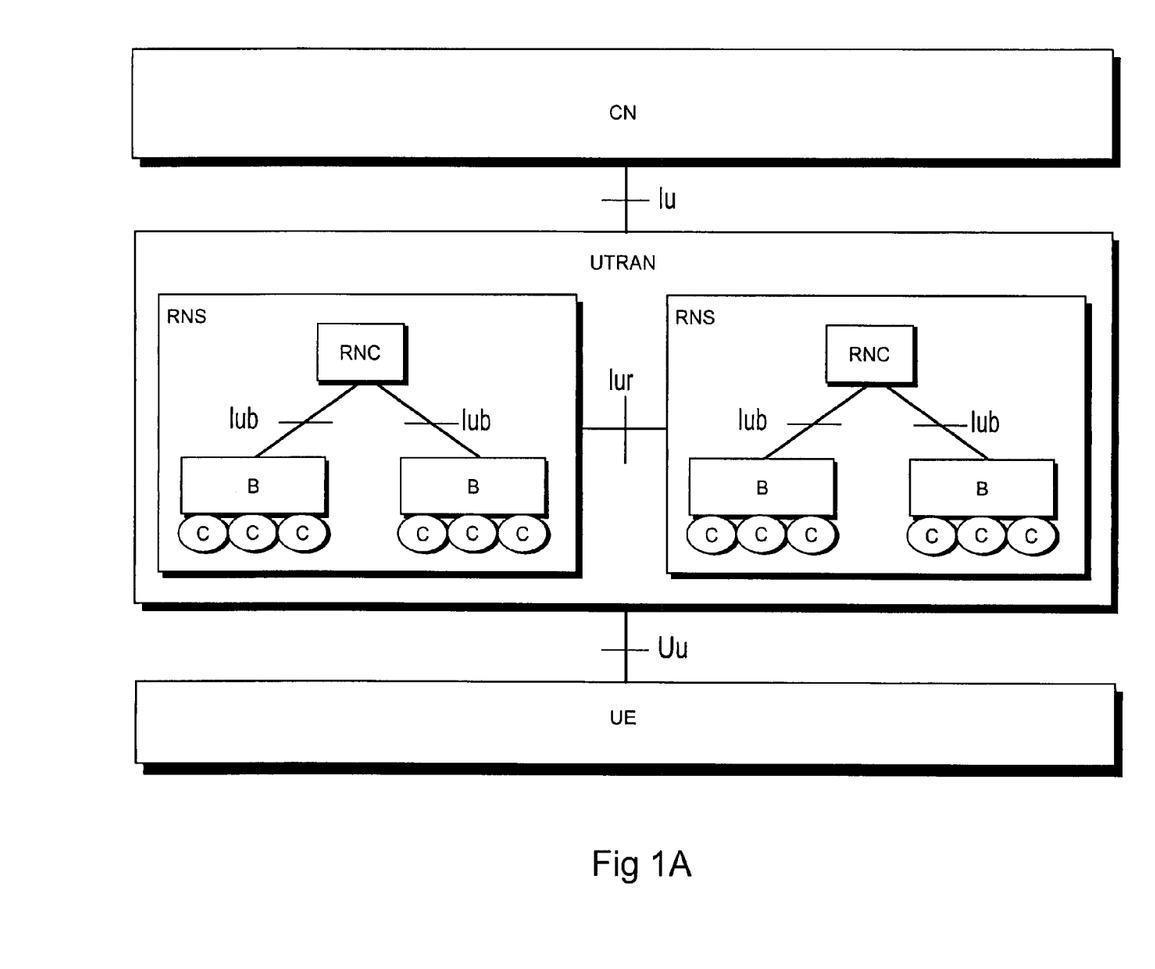
FIGS. 1A and 1B show an example of a structure of a mobile telephone system.
Figure 1B:
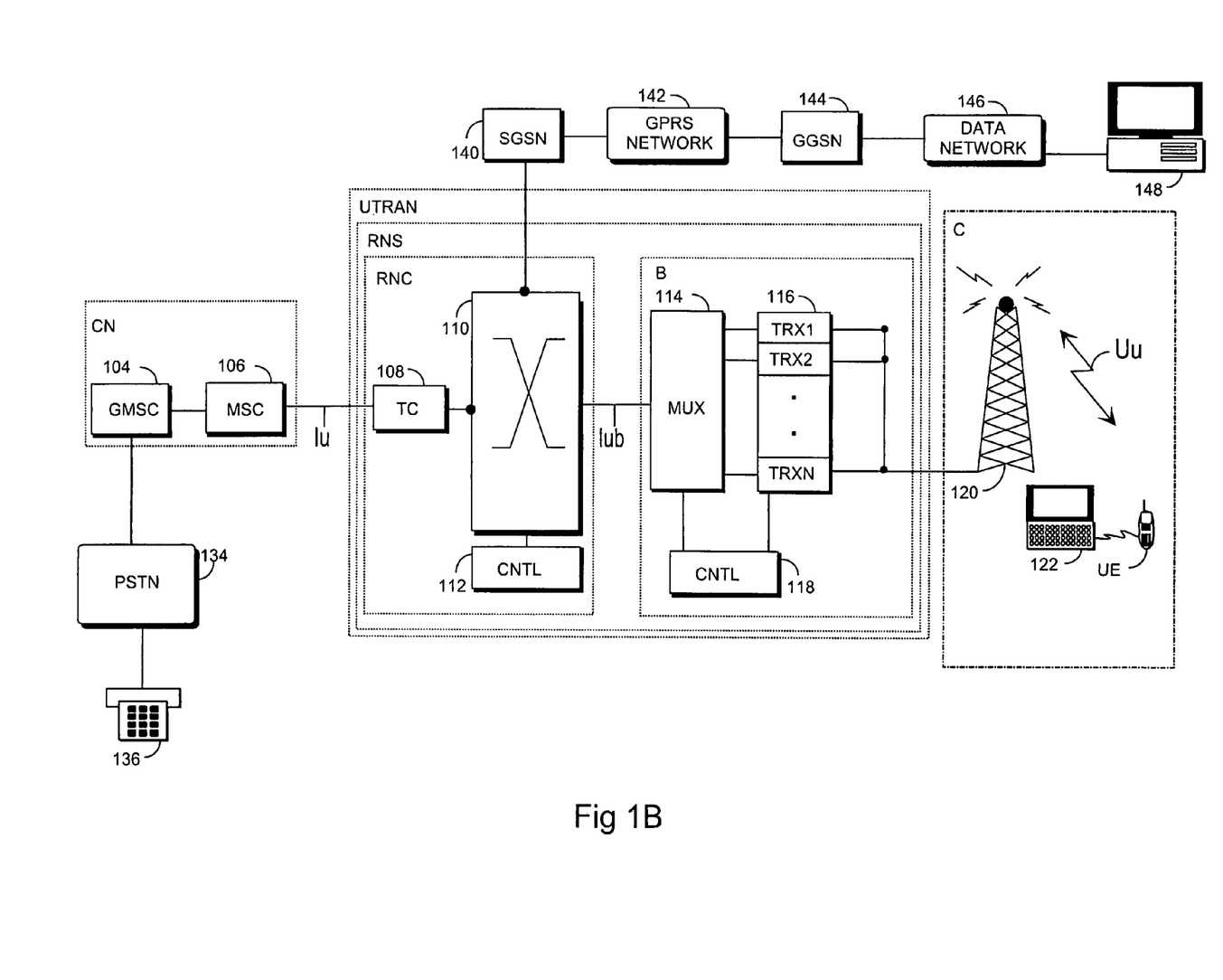

In addition to or in place of the short-range radio transceiver 204, the first radio means can also be implemented as a radio transceiver 206, 208 in the mobile telephone system. As shown by FIG. 2, the radio transceiver 206, 208 of the mobile telephone system may be located in the first device 200 or in connection with the same, or it can be located in a base station of the mobile telephone system communicating with the first device 200 when necessary. Referring to FIGS. 1A and 1B, the structure of the mobile telephone system will be described in closer detail later, but it can be stated here that in addition to the fact that the first device 200 can be user equipment in the mobile telephone system or a special server computer with its software, it can also be a part of a network element in the mobile telephone system, such as a base station, base station controller or a mobile services switching center.

As its protocol, the first radio means 204, 206, 208, 242 can, for example, use a short message service, WAP (Wireless Application Protocol), wireless local area network, GSM data call or GPRS (General Packet Radio Service), or another known wireless radio system protocol.

The system comprises at least one second portable electronic device 210 comprising second radio means 212, 216 for implementing data transmission. The second radio means may be a radio transceiver 212 of the mobile telephone system in connection with the second device 210, or a short-range radio transceiver 216. In principle, the second radio means can thus be similar to the first radio means, and the protocols used may also be similar ones. The functionality of the system naturally requires that in order to establish a connection, the radio means must be able to operate at the same frequency and use the same protocol. The second electronic device 210 is typically portable user equipment in the mobile telephone system, such as a WAP telephone or a device of the Nokia® Communicator® type, or it can also be a portable computer connected, with or without wires, to the necessary second radio means 212, 216.

The second device also comprises means 218 for processing information received from the virtual noticeboard 202 of the first device 200. In practice, the means 218 is a processor with its software or a hardware configuration as ASIC, for example.

Furthermore, the user equipment 210 typically comprises a keyboard 220, a display 222, a microphone 224 and a loudspeaker 226 for implementing the user interface. A rechargeable battery 228 usually serves as the power source.

The functionality of the system is shown in that the first radio means 204, 206, 208, 242 and the second radio means 212, 216 are arranged to carry out data transmission 300 from the first device 200 to the second device 210. By using the data transmission 300, information is transmitted from the virtual noticeboard 202 of the first device 200 to the second device 210.

As far as the advantages achieved by the system are concerned, it is important that the first radio means 204, 206, 208 are at least one location-bound base station 204 in the mobile telephone system permanently indicated by the first device 200, and/or the radio means 204, 208 in connection with the first device 200. According to the prior art, the first device 200 does not know the area from which a WAP telephone, for example, can establish a connection; consequently, the above-described problem of finding the right noticeboard arises, followed by the large amount of traffic on the air interface of the radio system.

The advantages can also be achieved in such a manner that the first radio means are at least one base station 242 in the mobile telephone system having a data transmission connection 240 to the first device 200. The data transmission connection 240 can even be implemented over a global data transmission network. The virtual noticeboard 202 of the first device 200 is then arranged to include in the transmitted information location information as metainformation on the area within which the second device 210 is located and for which second device the context in the virtual noticeboard 202 of the first device 200 is arranged.

In an embodiment, the selecting means 218, 220, 222 of the second device 210 are arranged only to show such virtual noticeboards 202 which transmit location information corresponding with the location of the second device 210. Filtration by selection can thus be used to decrease the amount of information shown to the user.

In an embodiment, the selecting means 218, 220, 222 of the second device 210 are arranged to show all virtual noticeboards 202 received. In any case, the user has already performed some kind of pre-selection by using the selecting means 218, 220, 222. The received virtual noticeboards 202 are preferably shown in order of relevance such that the virtual noticeboards 202 which transmit location information corresponding with the location of the second device 210 are shown first. This makes it easier for the user to find the relevant information.

In an embodiment, the second device 210 comprises means for location determination. The location determination means can be implemented as, for example, a GPS (Global Positioning Service) receiver, mobile telephone location determination logic implemented in the second device 210, location determination service implemented in the network part of the mobile telephone system, or by using another method known to one skilled in the art of implementing location determination of a terminal in a mobile telephone system.

In this connection, the term "permanent indication" refers to the fact that if the first radio means are a particular location-bound base station 206, it cannot vary, i.e. the connection 300 to the noticeboard 202 cannot be established from another base station's area but only through the base station 206 or a group of a few base stations. The base station 206 or the base stations cover a particular desired geographical area, such as an airport. A "permanent indication" is also implemented when the radio means of the first device 200 are the radio transceiver 208 of the mobile telephone system in connection with the first device 200 and/or the short-range radio transceiver 204, because in such a case, the first device 200 already knows the area from which the connection 300 can be established thereto. In the case of the shortrange radio transceiver 204, this area is the coverage area surrounding the first device 200 which is at most a few hundreds of meters in diameter. In the case of the radio transceiver 208 of the mobile telephone system, in turn, some part of the system has to know the base stations from the area of which the connection 300 can be established to the noticeboard. With the help of examples in FIGS. 3, 4, 5 and 6, different possibilities to establish the connection 300 between the first 200 and the second 210 devices will be explained in greater detail below.

Figure 3:
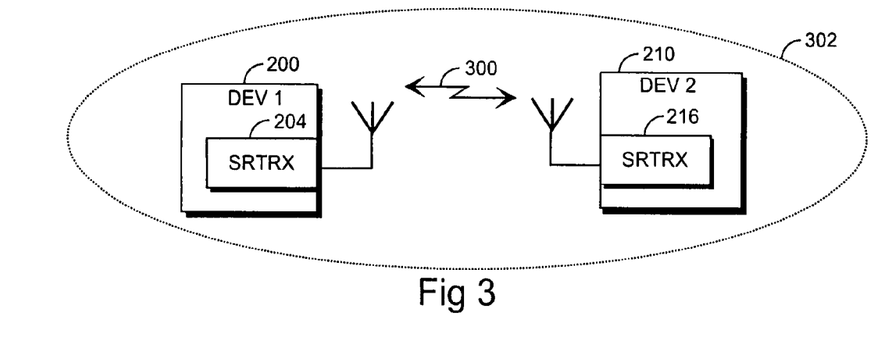
FIGS. 3, 4, 5 and 6 show different ways of implementing data transmission between the first and the second electronic devices.
Figure 4:
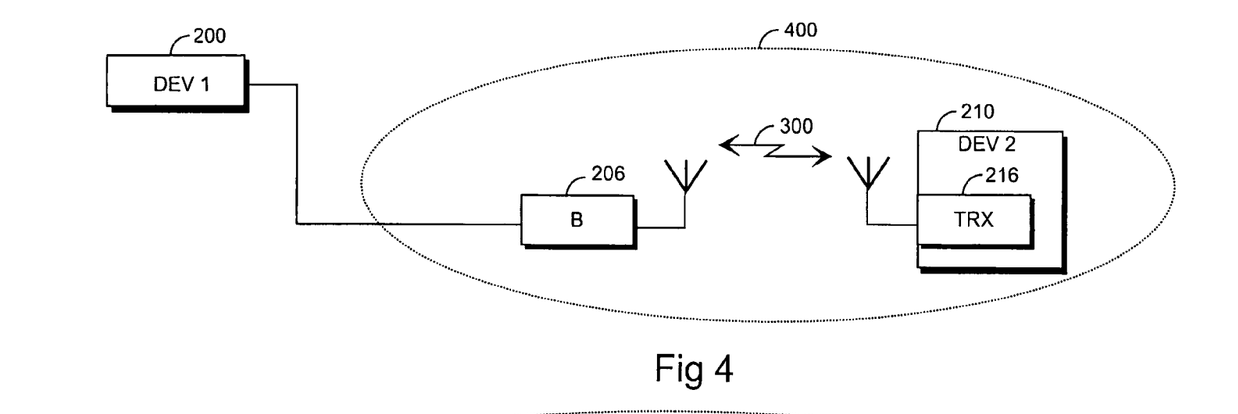

Since the area having potential traffic to the noticeboard 202 of the first device 200 is fixedly indicated or otherwise known, the context in the virtual noticeboard 202 of the first device 200 is arranged to be transmitted to the second device 210 located in a geographically limited coverage area 302, 400 of the first radio means 204, 206, 208, 242. In this connection, context refers to the fact that the information on the virtual noticeboard is such that the user of the second device 210 located in said limited coverage area might be interested in it. Hence, the context is determined by location, but, in addition, the context may also be determined by time, as will be shown by examples below.

In addition to what has been described above, the second device 210 comprises selecting means 218, 220, 222 for selecting the reception of the virtual noticeboard 202 of the first device 200. The selecting means are preferably implemented as a functional logic of the software carried out in the processor 218, the functional logic being controlled by the keyboard 220 and the display 222. The reception can be selected by using at least two different embodiments.

In a first embodiment, the selecting means 218, 220, 222 are arranged to show the noticeboards 202 received by the second radio means 212, 216, to select the noticeboards 202 desired by the user, and to request the first device 200 to transmit the selected piece of information from the noticeboard 202. This embodiment thus refers to a situation wherein the user browses the noticeboards which can be received in that area, and, in addition, the user can also select the noticeboards whose contents he or she wishes to view in closer detail.

In a second embodiment, the first device 200 comprises means for automatically transmitting information on the noticeboard 202 to all second devices 210 located in the coverage area. The user of the second device 210 can then select, by using the selecting means 218, 220, 222, whether or not to receive the information on the noticeboard 202 automatically transmitted by the first device 200. These two different embodiments of the selecting means will be further clarified in examples described later.

The examples describe the use of the invention in a universal mobile telephone system UMTS utilizing wideband code division multiple access without, however, restricting the invention thereto. The solution set forth may also be applied to TDMA (Time Division Multiple Access) systems, such as GSM (Global System For Mobile Communication). Or, as has become apparent from what has been disclosed above, the system can also be implemented by only using short-range radio transceivers, in which case the electronic devices are not user equipment of a mobile telephone system but, for example, personal pocket computers or organizers.

Referring to FIGS. 1A and 1B, the structure of a universal mobile telephone system will be described. FIG. 1B only comprises blocks relevant to the description of the invention, but it is obvious to one skilled in the art that a common mobile telephone system also comprises other functions and structures that need not be described here. The main parts of the mobile telephone system include a core network CN, a UMTS terrestrial radio access network UTRAN and user equipment UE. The interface between the CN and the UTRAN is called Iu, and the air interface between the UTRAN and the UE is called Uu.

The UTRAN comprises radio network subsystems RNS. The interface between the RNSs is called Iur. The RNS comprises a radio network controller RNC and one or more node Bs B. The interface between the RNC and B is called Iub. In FIG. 1B, the coverage area, i.e. cell, of node B is designated by C.

The description shown in FIG. 1A is highly abstract, so it will be clarified by disclosing, in FIG. 1B, which parts in the GSM and in the UMTS correspond roughly with each other. It is to be noted that since the responsibilities and functions of the different parts in the UMTS are still being planned, the description set forth is by no means restrictive but suggestive only.

As described in FIG. 1B, a circuit-switched connection can be established from the user equipment UE to a telephone 136 connected to a public switched telephone network 134 or to another terminal. The user equipment UE can, for example, be a fixedly located terminal, or a terminal located in a vehicle, or a portable terminal to be carried around. The radio network infrastructure UTRAN comprises the radio network subsystems RNS, i.e. base station systems. The radio network subsystem RNS comprises the radio network controller RNC, i.e. base station controller, and at least one node B, i.e. base station, controlled by the RNC.

The base station B comprises a multiplexer 114, transceivers 116 and a control unit 118, which controls the operation of the transceiver 116 and the multiplexer 114. The multiplexer 114 is used for placing the traffic and control channels used by a plurality of transceivers 116 onto the transmission connection Iub.

The transceivers 116 of the base station B communicate with an antenna unit 120, which is used for implementing the duplex radio connection Uu to the user equipment UE. The structure of the frames to be transmitted in the duplex radio connection Uu is specifically determined.

The base station controller RNC comprises a switching field 110 and a control unit 112. The switching field 110 is used for switching speech and data and for connecting signalling circuits. The base station system formed by the base station B and the base station controller RNC also comprises a transcoder 108. The responsibilities and the physical structure of the base station controller RNC and the base station B may vary according to the implementation. Typically, the base station B is responsible for the radio path implementation as described above. The base station controller RNC typically manages the following tasks: radio resource management, handover control, power control, timing and synchronisation, and paging user equipment.

The transcoder 108 is usually located as close to a mobile services switching center 106 as possible since speech can then be transmitted in the format of the mobile telephone system between the transcoder 108 and the radio network controller RNC using as little transmission capacity as possible. The transcoder 108 converts different formats of digital speech coding used between the public switched telephone network and the mobile telephone network into compatible ones from, for example, the 64 kbit/s format of the fixed network to another one (e.g. 13 kbit/s) of the cellular radio network, and vice versa. The necessary equipment will not be explained in greater detail in this connection, but it can, however, be stated that no other data than speech will be converted in the transcoder 108. The control unit 112 performs speech control, mobility management, collection of statistical data, and signalling.

The core network CN is composed of the infrastructure of the mobile telephone system outside the UTRAN. Of the equipment of the core network CN, FIG. 1B describes the mobile services switching center 106 and a gateway mobile services switching center 104, which is responsible for the connections of the mobile telephone system to the outside world, in this case to the Internet 146.

The radio system may also utilize packet-switched transmission, implemented by the GPRS (General Packet Radio Service), for example. The GPRS is a service which enables transmission capacity free from the circuit switch of the air interface to be used for packet transmission. Since the GPRS is a GSM-based service being developed, it will not be explained in this connection how the GPRS should be adapted technically so as to enable the GPRS to be used in the UMTS.

As can be seen from FIG. 1B, the switching field 110 can be used for establishing connections (designated by black dots) both to the public switched telephone network 134 through the mobile services switching center 106 and to a packet-switched network 142. Packet transmission is carried out through the Internet 146 from a computer 148 connected to the mobile telephone system to a portable computer 122 connected to the user equipment UE.

The connection between the packet-switched network 142 and the switching field 110 is established by a serving GPRS support node SGSN 140. The support node 140 is responsible for transmitting packets between the base station system and a gateway GPRS support node GGSN 144, and to keep a record of the location of the user equipment UE in its area.

The gateway node 144 connects the public packet-switched network 146 and the packet-switched network 142. The interface may utilize an Internet protocol or X.25 protocol. By encapsulation, the gateway node 144 hides the inner structure of the packet-switched network 142 from the public packet-switched network 146, so the packet-switched network 142 seems like a subnetwork to the public packet-switched network 146, and the public packet-switched network 146 may transmit packets to the user equipment UE located in the subnetwork and it may also receive packets from the same.

The packet-switched network 142 is typically a private network utilizing an Internet protocol and transmitting signalling and user data. Below the Internet-protocol layer, the structure of the network 142 may vary according to the operator both in its architecture and protocols.

The public packet-switched network 146 may, for example, be the global Internet, to which the user equipment 148, e.g. a server computer, with a connection thereto wishes to transfer packets to the user equipment UE.

The first device 200 shown in FIG. 2 may be the computer 148 in the system described in FIG. 1B, the computer 148 then communicating, by using the GPRS, with the second device 210, which, in FIG. 1B, is the user equipment UE with the portable computer 122 connected thereto.

The equipment required by the electronic system and the structure of the mobile telephone system used in an embodiment of the system having now been described, the implementation and purpose of data transmission between the first and the second devices can now be described with the help of a few simple examples.

FIG. 3 shows how the data transmission connection 300 between the first device 200 and the second device 210 is implemented by using the short-range radio transceivers 204, 216. The geographically limited coverage area 302 of the first device 200 is designated by a broken line in FIG. 3. When the second device 210 is located within the coverage area 302, the second device 210 can receive information from the noticeboard of the first device 200. When the user of the second device 210 leaves the coverage area 302, it is no longer possible to update the noticeboard. The user may, by using the settings of the second device 210, select whether to delete the noticeboard completely or whether to store information therein, if desired. A possibility is that the user could store the address of the noticeboard and then later visit the noticeboard by utilizing the Internet even though he or she were not located within the normal coverage area 302 of the noticeboard. This feature is optional, the settings of the first device 200 determining whether or not this feature is a possible one.

FIG. 4 shows how the data transmission connection 300 is established between the first device 200 and the second device 210 such that the first device 200 communicates with base station 206 of the cellular radio network from which the radio connection 300 is further established to the radio transceiver 216 of the second device 210 located in the cell 400.

Figure 5:
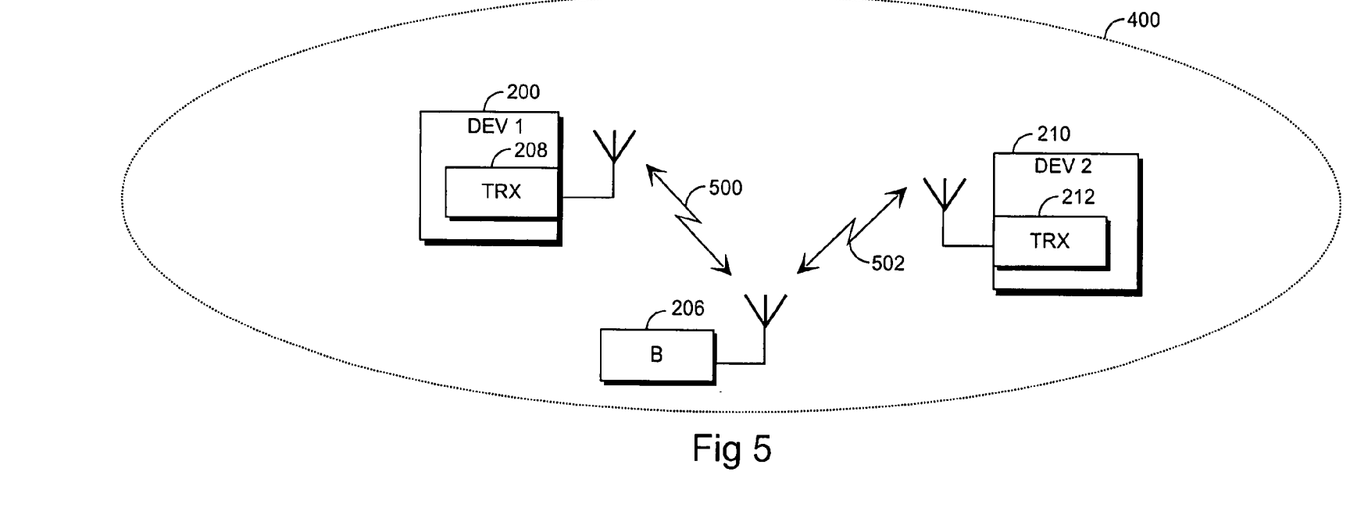

FIG. 5 shows an embodiment in which both the first device 200 and the second device 210 are subscriber equipment in a wireless mobile telephone system. In such a case, a radio connection 500 is established from the radio transceiver 208 of the mobile telephone 200 playing the role of the first device to the base station 206 of the cellular radio network from which a further radio connection 502 is established to the radio transceiver 212 of the mobile telephone 210 playing the role of the second device. A part of the system, e.g. a network part of the mobile telephone system, comprises information stored therein on the fact that a data transmission connection between the first 200 and the second 210 devices may only exist when the second device 210 is located within a certain geographically limited area, i.e. in the cell 400 of the base station 206. As mentioned above, embodiments are also feasible wherein, instead of one cell 400, several cells have been determined as a geographically limited area larger than one cell.

The above-described electronic system has two main uses. The first one is the implementation of a virtual noticeboard 202 which is bound to a physical location, such as an airport, railway station, vehicle, train, business location, store, restaurant, office, conference site, trade fair site or building. At an airport, the noticeboard can be used for transmitting information e.g. on flights being delayed to the user of the second device. On the other hand, by using his or her own user equipment, the user him- or herself can browse the range of products at the airport stores, for example. In an embodiment, the information on the noticeboard 202 of the first device 200 is only transmitted to such a second device 210 which meets predetermined conditions for the use. With regard to the airport example, only an owner of a certain credit card or an owner of a membership card of a certain airline may be shown offers provided by certain shops, i.e. the conditions for the use are based on membership in a group or on a particular user profile. The particular advantage of this embodiment is that well-targeted information can be transmitted to a person in the right place at the right time. Different commercial applications based on the example described above will readily occur to one skilled in the art, for example a noticeboard in an international conference to be browsed by the participants, and, furthermore, information e.g. on the timetable having been rescheduled being automatically transmitted to the registered participants in the conference.

A second use of the electronic system is implemented such that the virtual noticeboard 202 is bound to the first electronic device 200. In such a case, the virtual noticeboard 202 is the personal noticeboard of the user of the first device 200. A simple example according to FIG. 6 will clarify this use. The user of the first device 200 is at the airport and would like to take a taxi to the city center. He or she can automatically transmit a message 600 to all users of the second devices 210, 610, 612 located within the coverage area. The contents of the message are: "Would anyone else like to take a taxi to the city center? Let's meet at the entrance". The user of the device 210 receives the message but he or she is either not going to the city center or he or she is otherwise not interested in the issue. The user of the device 610 is going to the city center, so he or she transmits a reply message 602: "I'd like to get to the railway station. I'll meet you at the entrance". The user of the device 612 replies with a message 604: "I'd like to get to the church in the city center. Let's meet at the entrance". The users of the devices 200, 610, 612 then meet at the entrance of the airport terminal and make out the route the taxi is to take and the way in which the expenses are to be shared. The terminal 614 in FIG. 6 does not receive the message 600 transmitted by the user of the device 200 at all since he or she has chosen, by using the selecting means 218, 220, 222 of his or her device 614, not to receive any automatically transmitted messages. In the described example, certain conditions for the use can also be set to be fulfilled by the second device 210, 610, 612, 614 so as to enable them to receive the message 600. An example of such a condition is a membership in a group, being an employee for a given employer, for example.

Figure 6:
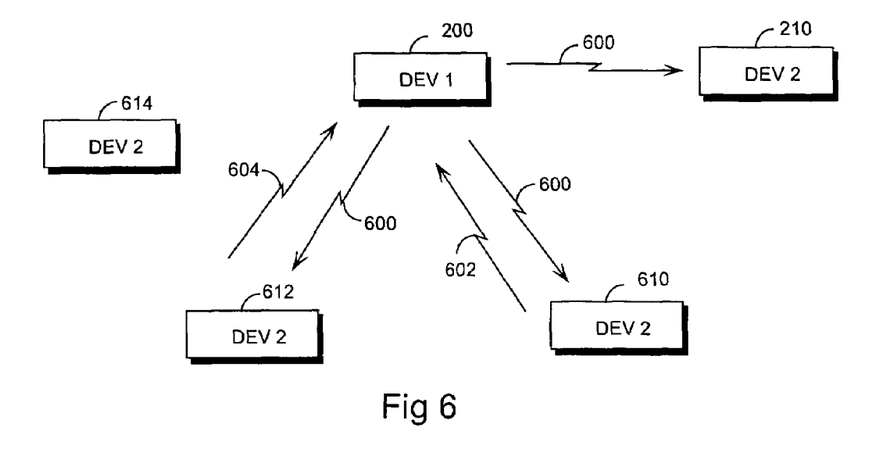

In an embodiment, the first device 200 comprises means for determining whether to include contact information in the information automatically transmitted to the second device 210 or whether to keep the source of the information anonymous. This function can be used for controlling the protection of privacy. For example, imagine a situation wherein the user of the user device 200 is travelling on a train and would like to have a game of snake, which is implemented on the display of the subscriber equipment, with a co-traveller. In such a case, he or she transmits the message 600 anonymously, and if the owner of the second user device 610 wants to play, he or she transmits the reply message 602, and the game may begin. The opponent's game situation, i.e. the movement of the opponent's snake and his score, can be transferred to one's own terminal by using the same data transmission connection as was used in transmitting the message 600 and the reply message 602. In an embodiment, the second device 210 comprises means for determining whether to include contact information in the reply message transmitted to the first device 200 or whether to keep the second device 210 anonymous. In the snake game example, neither one of the two players can thus see each other's contact information unless so desired.

In an embodiment, the first device 200 comprises means for calculating how many times a certain piece of information has been retrieved from the virtual noticeboard 202 at issue. If, for example, the virtual noticeboard 202 carries a "for sale" advertisement, the user of the first device 200 can check whether his or her advertisement has aroused any interest.

In an embodiment, the second device 210 comprises means for transmitting the information retrieved from the virtual noticeboard 202 of the first device 200 to the application processing the information. For example, if the transmitted information is a timetable for an event, the user of the second device 210 can readily transfer the information on the timetable to his or her calendar application, by dragging, for example, the icon symbolizing the retrieved information onto the icon symbolizing the calendar application.

In an embodiment, the application of the second device 210 processing the information is communication software enabling data transmission from the second device 210 with a party determined in the retrieved information. If, for example, the retrieved information comprises an e-mail address, the communication software creates a basis for an e-mail message in advance, and the retrieved e-mail address will be placed in the address field of the e-mail message. If the retrieved information comprises a telephone number, the second device 210 can automatically make a call to the number. The telephone number may also be stored in the address book application of the second device 210.

Figure 7A:
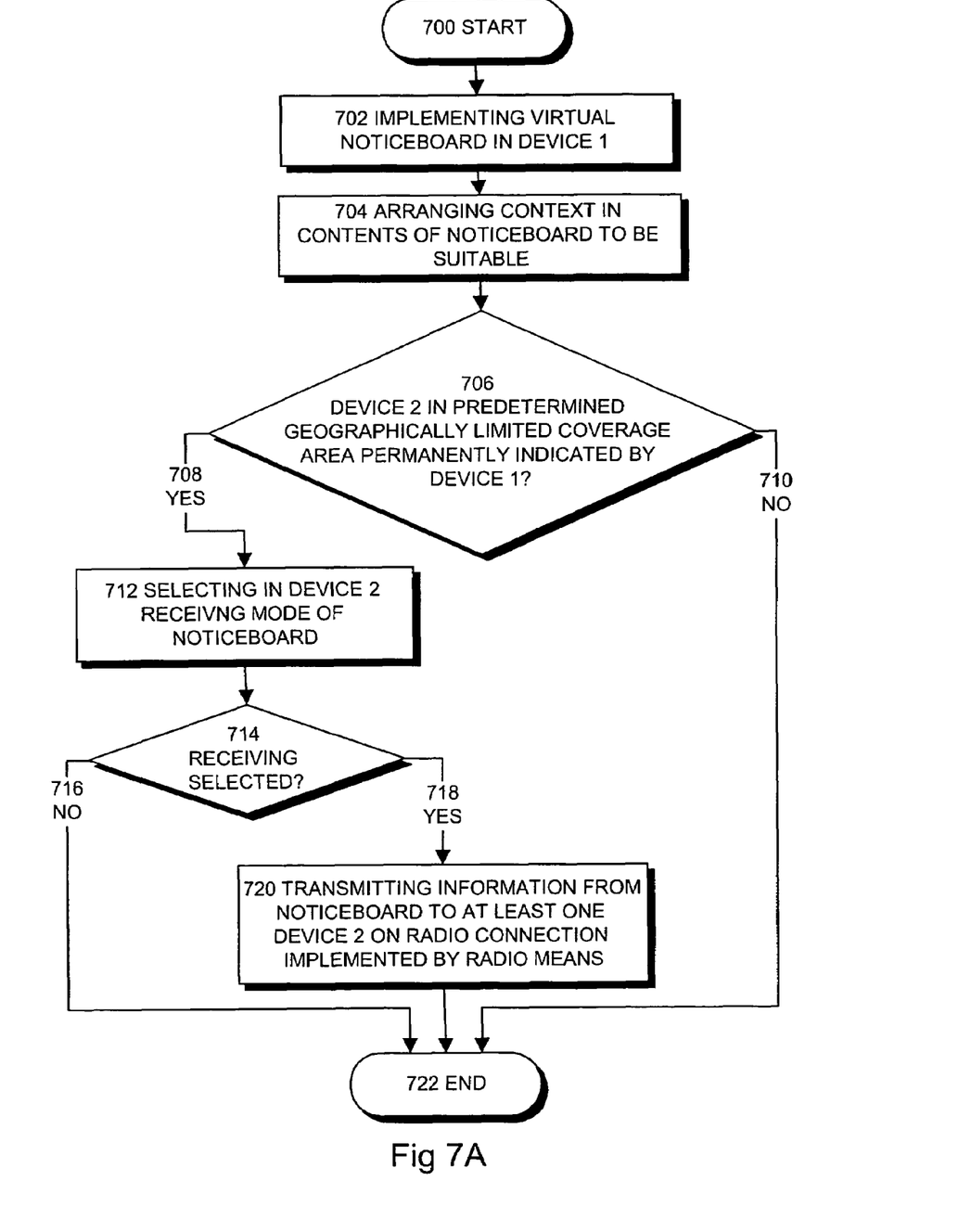
FIGS. 7A and 7B are flow diagrams illustrating methods of using a virtual noticeboard.

Next, referring to the flow diagram of FIG. 7A, the method for using the virtual noticeboard used in connection with the electronic system explained above will be described. The process begins in block 700. In block 702, the virtual noticeboard 202 is implemented in the electronic device 200. Next, in block 704, the context in the contents of the virtual noticeboard 202 of the first device 200 is arranged to be transmitted to the second device 210 located within the geographically limited coverage area of the first radio means 204, 206, 208, 242. These operations in blocks 702, 704 will probably be carried out while building up the system, and henceforth when the coverage of the system changes or when information is updated, added or removed.

Next, in the optional block 706, it is checked whether the second device 210 is located within the predetermined, geographically limited coverage area permanently indicated by the first device 200. If not, the process advances in accordance with arrow 710 to block 722 wherein the process ends. If the condition in block 706 is met, the process advances in accordance with arrow 708 to block 712 wherein, in the device 210, the receiving mode of the noticeboard is selected as described above in connection with the system, i.e. in practice, block 712 does not necessarily have to be located here in the functional sequence but it can also be elsewhere since the function is carried out in the second device 210 and not in the first device 200 like operations 702, 704.

Next, in block 714, it is checked which receiving mode was selected in block 714. If the reception is not accepted, the process advances, according to arrow 716, to end block 722. If, on the other hand, the reception has been chosen, the process advances, according to arrow 718, to block 720 wherein information from the virtual noticeboard 202 of the first device 200 is transmitted on the radio connection implemented by the radio means 204, 206, 208, 242, 212, 216 to be processed by at least one second electronic device 210. When the necessary data transmission of the noticeboard has been completed, the process is eventually terminated in block 722.

Figure 7B:
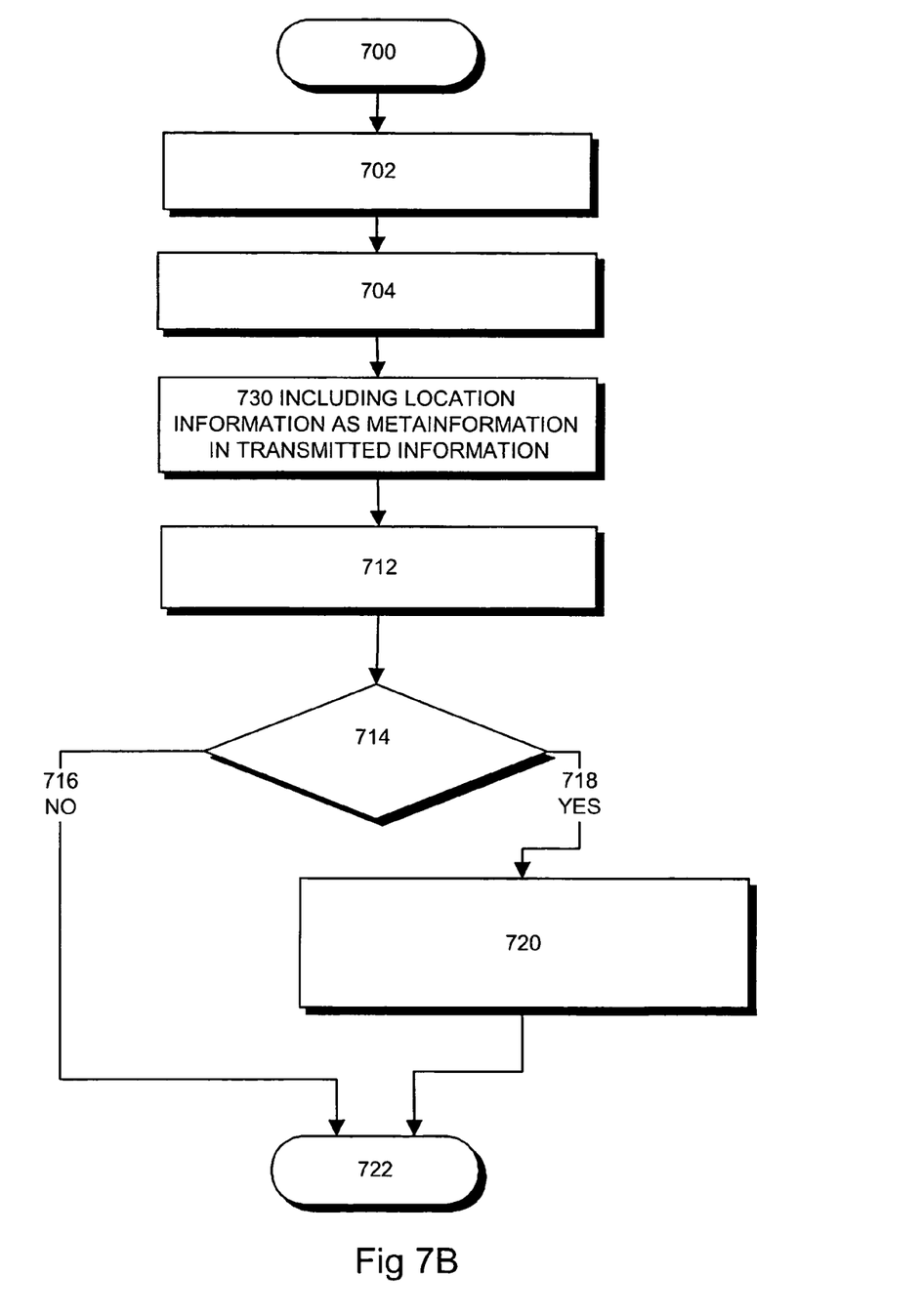

The method can be modified in accordance with the accompanying dependent claims specifying the method by following the same instructions during the implementation as have been described above in connection with the system. FIG. 7B describes an embodiment of the method wherein the second device 210 does not have to be located in the geographically limited coverage area permanently indicated by the first device 200 but, in block 730, the virtual noticeboard 202 of the first device 200 includes in the transmitted information location information as metainformation on the area within which the second device 210 is located and for which second device the context in the virtual noticeboard 202 of the first device 200 is arranged. The second device 210 can thus utilize this location information as described above.

Figure 8:
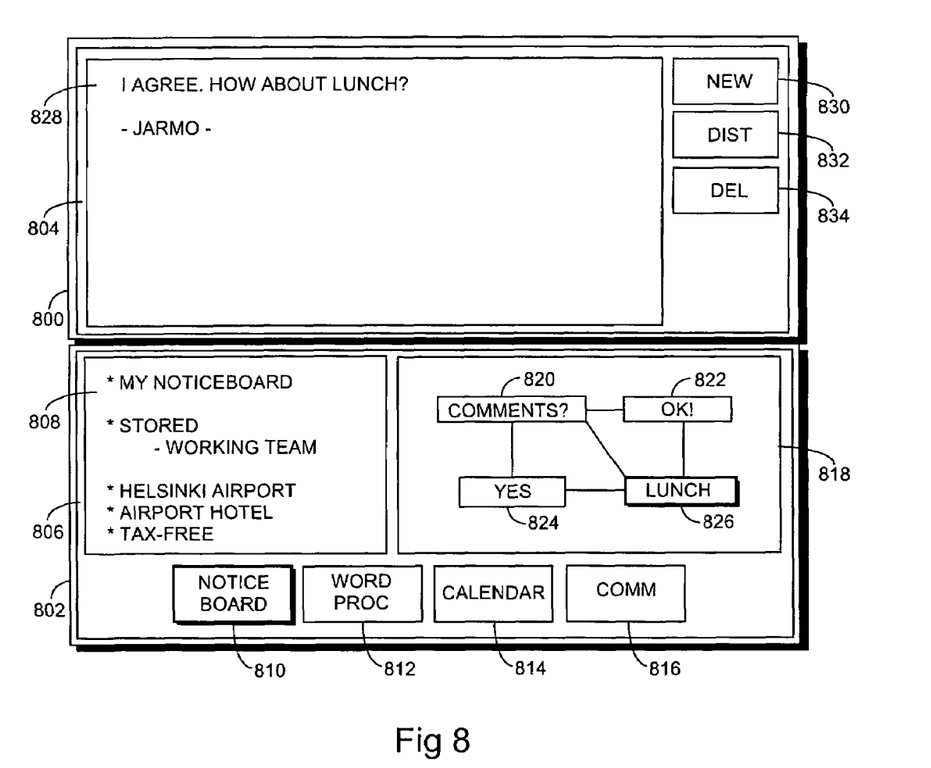
FIG. 8 illustrates an example of a user interface for using the virtual noticeboard.

FIG. 8 shows an example of an interface for using the virtual noticeboard 202. The device shown in FIG. 8 is a device of the Nokia® Communicator® type, i.e. it comprises a miniature computer with its software and user interface, and a radio transceiver necessary for being able to serve as user equipment in a mobile telephone system. The structure of the device is thus similar to that of the second device 210 described in FIG. 2. The device in FIG. 8 comprises two halves 800, 802 which, when closed, are arranged against each other, and when opened, form a uniform plane or two planes inclined with respect to each other. Each of the two halves of the device of the example comprises a display 804, 806 but the device could also be implemented with one display, the second half comprising a keyboard, for example. The display 804, 806 can be a black-and-white or a color liquid crystal display, for example. In the example of FIG. 8, the displays 804, 806 are touch screens, in which case no separate keyboard is necessary.

In the lower display 806, a field 808 shows the virtual noticeboards known to the device. The device comprises a user's personal noticeboard MY NOTICEBOARD, stored noticeboards STORED which are located in some other device than this one, and location-bound noticeboards, which, in our example, relate to an airport, i.e. the noticeboard at issue is the noticeboard of the Helsinki airport HELSINKI AIRPORT, the noticeboard of the hotel at the airport AIRPORT HOTEL, and the noticeboard of the tax-free shop at the airport TAX-FREE.

The personal noticeboard MY NOTICEBOARD can be used for personal information management and time management. The user may place his or her current and important information here. The user can create new messages and copy information from another application, from the calendar, for example. When the information in a message is changed, the original information can also be updated automatically.

The stored noticeboards STORED comprise noticeboards which relate to a certain group of people, or stored connections to location-bound noticeboards. A noticeboard bound to a group of people can be used for communication, announcements, etc. The purpose is not to replace e-mail but to implement a communication tool which, at its best, can comprise all information necessary for the group.

The location-bound noticeboards become available to the user when he or she is located in the location at issue. In some cases, the user can add his or her own message to the location-bound noticeboard and also remove the message. In some cases, the message added by the user can be removed when the user leaves the coverage area of the location-bound noticeboard. The user may also copy messages from the location-bound noticeboard to his or her personal noticeboard MY NOTICEBOARD. The user may also store links to the location-bound noticeboards, in which case the connections would be located in the stored noticeboards STORED.

The lower part of the lower display 806 comprises buttons which enable the desired application to be selected. The buttons are implemented for a touch screen. A first button 810 is for selecting a virtual noticeboard application. As can be seen from FIG. 8, the virtual noticeboard application has been selected since the corresponding button 810 is pressed down, i.e. the shadow on the display has been used for creating a three-dimensional effect. A second button 812 represents a word processing application, a third button 814 a calendar, and a fourth button 816 communication software.

A right hand field 818 of the lower display 806 shows the selected virtual noticeboard. The selected virtual noticeboard is a noticeboard WORKING TEAM of a working team stored in the stored noticeboards STORED. It can be seen from the field 818 that a member in the working team has asked for comments on his or her idea by placing a message 820 on the noticeboard. The idea has received approval in messages 822, 824. A member in the working team has then added a new message 826 to suggest lunch. As can be seen from FIG. 8, the relationships between the separate messages can be described graphically, i.e. in this example, the messages 820, 822, 824, 826 are connected with each other by lines. This makes it easier to follow the course of the communication.

The message 826 is selected, in which case a field 828 in the upper display 804 shows the contents of the message "I AGREE. HOW ABOUT LUNCH? -JARMO-". The right hand side of the upper display 804 comprises command buttons for selecting how to process the message. Key 830 is for creating a new message, button 832 for transmitting the message to the noticeboard, and button 834 for removing the message. The contents of the command buttons depend on the type and context of the use of the noticeboard.

Although the invention has been described above with reference to the example according to the accompanying drawings, it is obvious that the invention is not restricted thereto but can be modified in many ways within the scope of the inventive idea disclosed in the attached claims.

The invention claimed is:

1. An electronic system comprising:
a first electronic device comprising an implementing device for implementing a virtual noticeboard within the first electronic device, and a first radio device for implementing data transmission transmitting information from the virtual noticeboard to a second portable electronic device, and context in the virtual notice board is arranged to be transmitted to the second portable electronic device after entering a geographically limited coverage area of the first radio device; and
said second portable electronic device comprising a second radio device for implementing the data transmission transmitting information from the virtual noticeboard to the second portable electronic device, a device for processing information received from the virtual noticeboard and a selecting device for selecting reception of the virtual noticeboard;
wherein the first electronic device is portable user equipment in a telephone system, the first radio device is arranged to implement data transmission with regard to the virtual noticeboard such that a new message, a reply and/or a comment is received from the second portable electronic device, said new message, said reply and/or said comment comprises textual data and the implementing device for implementing the virtual noticeboard of said first electronic device is arranged to display the new message, the reply and/or the comment in the virtual noticeboard, wherein the first electronic device comprises a device for automatically transmitting information on the noticeboard to all second devices located in the coverage area and the second electronic device comprises a device for determining whether to include contact information in the reply information transmitted to the first electronic device or whether to keep the second electronic device anonymous.

2. The system as claimed in claim 1, wherein the second electronic device is portable user equipment in the mobile telephone system.

3. The system as claimed in claim 1, wherein the first radio device is a short-range radio transceiver or a radio transceiver in the mobile telephone system.

4. The system as claimed in claim 1, wherein as a protocol, the first radio device use a short message service, WAP (Wireless Application Protocol), wireless local area network, GSM data call or GPRS (General Packet Radio Service), or another wireless radio system protocol.

5. The system as claimed in claim 1, wherein the virtual noticeboard is bound to the first electronic device.

6. The system as claimed in claim 5, wherein the virtual noticeboard is a personal noticeboard of a user of the first electronic device.

7. The system as claimed in claim 1, wherein the selecting device is arranged to show the noticeboard received by the second radio device, to select the noticeboards desired by a user, and to request the first electronic device to transmit the selected piece of information from the noticeboard.

8. The system as claimed in claim 1, wherein the selecting device is used for selecting whether or not to receive the information on the noticeboard automatically transmitted by the first electronic device.

9. The system as claimed in claim 1, wherein the first electronic device comprises a device for determining whether to automatically include contact information in the information transmitted to the second devices or whether to keep the source of information anonymous.

10. The system as claimed in claim 1, wherein the first electronic device comprises a for calculating how many times a certain piece of information has been retrieved from its virtual noticeboard.

11. The system as claimed in claim 1, wherein the second electronic device comprises a for transmitting the information retrieved from the virtual noticeboard of the first electronic device to the application processing the information.

12. The system as claimed in claim 11, wherein the application processing the information is communication software enabling data transmission from the second device with a party determined in the retrieved information.

13. The system as claimed in claim 1, wherein the information on the noticeboard of the first electronic device is only transmitted to such second devices which meet predetermined conditions for use.

14. The system as claimed in claim 13, wherein the conditions for use are based on membership in a group or on a particular user profile.

15. The system as claimed in claim 1, wherein the transmitted information on the noticeboard is text and/or voice and/or images and/or moving video image.

16. The system as claimed claim 1, wherein the context, in addition to location, also comprises time.

17. A method of using a virtual noticeboard, comprising:
implementing the virtual noticeboard in a first electronic device;
transmitting, on a radio connection implemented by a radio device of the first electronic device, information from the virtual noticeboard of the first device to be processed by at least one second electronic device;
arranging context in contents of the virtual noticeboard to be transmitted to the second portable electronic device after entering a geographically limited coverage area of first radio means;
selecting, in the second portable electronic device, a receiving mode of the virtual noticeboard;
transmitting, on a radio connection, data transmission with regard to the virtual noticeboard such that a new message, a reply and/or a comment is received in the first electronic device from the second portable electronic device, said new message, said reply and/or said comment comprising textual data; and
display the new message, the reply and/or the comment in the virtual noticeboard;
wherein the first electronic device is portable user equipment in a mobile telephone system, the first electronic device automatically transmits information on the noticeboard to all second devices located in the coverage area and the second electronic device is used for determining whether to include contact information in the reply information transmitted to the first electronic device or whether to keep the second electronic device anonymous.

18. The method as claimed in claim 17, wherein the second electronic device is portable user equipment in the mobile telephone system.

19. The method as claimed in claim 17, wherein the first radio device is a short-range radio transceiver or a radio transceiver in the mobile telephone system.

20. The method as claimed in claim 17, wherein as a protocol, the first radio device uses a short message service, WAP (Wireless Application Protocol), wireless local area network, GSM data call or GPRS (General Packet Radio Service), or another wireless radio system protocol.

21. The method as claimed in claim 17, wherein the virtual noticeboard is bound to the first electronic device.

22. The method as claimed in claim 21, wherein the virtual noticeboard is a personal noticeboard of a user of the first device.

23. The method as claimed in claim 17, wherein the selection of a receiving mode comprises:
showing, in the second electronic device, noticeboards received by a radio device of the second electronic device,
selecting the noticeboards desired by a user; and
requesting the first electronic device to transmit the selected piece of information from the noticeboard.

24. The method as claimed in claim 17, wherein a user of the second device selects whether or not to receive the information on the noticeboard automatically transmitted by the first electronic device.

25. The method as claimed in claim 17, wherein the first electronic device is used for determining whether to automatically include contact information in the information transmitted to the second devices or whether to keep the source of information anonymous.

26. The method as claimed in claim 17, wherein the first electronic device is used for calculating how many times a certain piece of information has been retrieved from its virtual noticeboard.

27. The method as claimed in claim 17, wherein the second electronic device is used for transmitting the information retrieved from the virtual noticeboard of the first electronic device to the application processing the information.

28. The method as claimed in claim 27, wherein the application processing the information is communication software, and a data transmission connection is established with a party determined in the retrieved information.

29. The method as claimed in claim 17, wherein the information on the noticeboard of the first electronic device is only transmitted to such second devices which meet predetermined conditions for use.

30. The method as claimed in claim 29, wherein the conditions for use are based on membership in a group or on a particular user profile.

31. The method as claimed in claim 17, wherein the transmitted information on the noticeboard is text and/or voice and/or images and/or moving video image.

32. The method as claimed in claim 17, wherein the context, in addition to location, also comprises time.

33. An electronic device comprising:
- a device for implementing a virtual noticeboard within the first electronic device;
- a first radio device for implementing data transmission transmitting information from the virtual noticeboard to a second portable electronic device and context in the virtual noticeboard is arranged to be transmitted to the second portable electronic device located within a geographically limited coverage area of the first radio device;

wherein the electronic device is portable user equipment in a mobile telephone system, the first radio device is arranged to implement data transmission with regard to the virtual noticeboard such that a new message, a reply and/or a comment is received from the second portable electronic device, said new message, said reply and/or said comment comprises textual data and the device for implementing the virtual noticeboard is arranged to display the new message, the reply and/or the comment in the virtual noticeboard, the first electronic device comprises a device for automatically transmitting information on the noticeboard to all second devices located in the coverage area and the second electronic device comprises a device for determining whether to include contact information in the reply information transmitted to the first electronic device or whether to keep the second electronic device anonymous.

* * * * *

UNITED STATES PATENT AND TRADEMARK OFFICE
CERTIFICATE OF CORRECTION

PATENT NO.          : 7,466,988 B2
APPLICATION NO.     : 09/892035
DATED               : December 16, 2008
INVENTOR(S)         : Koskinen et al.

Page 1 of 1

It is certified that error appears in the above-identified patent and that said Letters Patent is hereby corrected as shown below:

Column 12, line 64, in claim 1, before "telephone" insert --mobile--.

Column 13, line 22, in claim 4, delete "use" and insert --uses--, therefor.

Column 13, line 46, in claim 10, after "a" insert --device--.

Column 13, line 50, in claim 11, after "a" insert --device--.

Column 14, line 6, in claim 17, after "transmitting" delete ",".

Column 14, line 6, in claim 17, before "radio" insert --first--.

Column 14, line 8, in claim 17, after "first" insert --electronic--.

Column 14, line 9, in claim 17, after "second" insert --portable--.

Column 14, line 14, in claim 17, delete "means" and insert --device-- therefor.

Column 16, line 5, in claim 33, delete "located within" and insert --after entering--, therefor.

Signed and Sealed this

Ninth Day of June, 2009

JOHN DOLL
*Acting Director of the United States Patent and Trademark Office*